United States Patent [19]

Antony

[11] Patent Number: 5,123,505

[45] Date of Patent: Jun. 23, 1992

[54] AUTOMATIC ADJUSTMENT DEVICE FOR A MECHANICALLY ACTUATED SLIDING SADDLE DISK BRAKE

[75] Inventor: Paul Antony, Bürstadt, Fed. Rep. of Germany

[73] Assignee: Deutsche Perrot-Bremse GmbH, Mannheim-Friedrichsfeld, Fed. Rep. of Germany

[21] Appl. No.: 772,658

[22] Filed: Oct. 7, 1991

[30] Foreign Application Priority Data

Oct. 5, 1990 [DE] Fed. Rep. of Germany ....... 4031616

[51] Int. Cl.⁵ ............................................. F16D 65/52
[52] U.S. Cl. ................................. 188/71.9; 188/72.8; 188/196 F; 188/196 D
[58] Field of Search ............... 188/71.9, 71.8, 196 R, 188/196 BA, 196 D, 72.7, 72.8, 106 F, 106 R, 72.9, 72.4, 72.6, 196 V, 71.7, 196 B, 196 F; 192/111 A

[56] References Cited

U.S. PATENT DOCUMENTS 4,981,197   1/1991   Antony et al. ..................... 188/71.9

FOREIGN PATENT DOCUMENTS 0271864   6/1988   European Pat. Off. .
2560024   8/1975   Fed. Rep. of Germany .
3005420   9/1980   Fed. Rep. of Germany .
3445563   6/1986   Fed. Rep. of Germany .
3814475  11/1989   Fed. Rep. of Germany .
3841593   6/1990   Fed. Rep. of Germany .

Primary Examiner—Douglas C. Butler
Attorney, Agent, or Firm—Fleit, Jacobson, Cohn, Price, Holman & Stern

[57] ABSTRACT

A continuous automatic adjustment device for a mechanically actuated sliding saddle disk brake (1, 2, 3, 4, 5, 6) wherein the mechanically actuated device for moving the sliding saddle (1) vis-a-vis the brake disk (6) includes a diagonal-track spreading device (10, 11, 12) around an actuating shaft (7). The adjustment device has an adjustment nut (14) coupled with the actuating shaft (7) by a directional clutch (33) which operates in the direction of actuation when actuating shaft (7) turns and is formed by a wrap spring (33) or a freewheeling sleeve (34, 35). A force-dependent coupler (30) can be axially released from the action of a compression spring (23) when a given torque is exceeded by the actuation shaft, thereby preventing rotation from being transmitted to the adjustment nut.

15 Claims, 4 Drawing Sheets

AUTOMATIC ADJUSTMENT DEVICE FOR A MECHANICALLY ACTUATED SLIDING SADDLE DISK BRAKE

BACKGROUND OF THE INVENTION

The invention relates to an automatic adjustment device for a mechanically actuated disk brake, including a sliding saddle that moves on a diagonal relative to the brake disk and whose two saddle halves, each has a brake lining support and a brake lining, cover the brake disk, an actuating shaft that has a rotating mount in one of the saddle halves, the bushed end of which exhibits a radially projecting collar, one side of which is furnished with diagonal tracks for the reception of balls, which tracks correspond to diagonal tracks on a bearing ring and serve to convert the rotational motion of the actuating shaft into the axial motion of a pressure screw which is mounted in torque-resistant fashion to a piston, while the actuating shaft is supported by an axial bearing on the sliding saddle to secure it against axial displacement on the side of the collar facing away from the diagonal tracks, and the bearing ring is capable of axial motion relative to the brake saddle, but is secured against rotation, and is supported by a sleeve-like adjustment nut into which the pressure screw is screwed and which is attached in torque-resistant fashion to an extension piece which coaxially passes through the actuating shaft. An adjustment ring is rotationally mounted relative to the extension piece, the adjustment ring or the actuating shaft having a radial pin that engages in a groove of the actuating shaft or of the adjustment ring. An adjustment sleeve is positioned on the extension piece, the adjustment ring and the adjustment sleeve having spiral gearings on their facing sides, and one of the two adjustment parts having a spiral gearing supported by a collar of the adjustment nut. A spring component is supported on the other adjustment part in order to maintain the engagement of the two spiral gearings, a directional clutch is positioned in the power flow from the adjustment ring to the adjustment nut and takes effect in the direction of brake actuation upon rotation of the actuating shaft, and a torque limiting device limits the torque that can be transferred from the adjustment ring to the adjustment nut.

An adjustment device of this type described in German Patent Document DE-OS 38 14 475 employs a movable saw-tooth catch to adjust the wear on brake linings by stages. The clearing play is thus determined by the selected tooth spacing. Reducing the clearing play with a very small spacing is impossible for manufacturing reasons, however.

Thus in overcoming the clearing play, a correspondingly large actuation stroke (return stroke) is necessary for brake actuation, and a reduction in the actuation path reserve may also be evident. The size of the actuating stroke, however, is also determined by the incline of the diagonal tracks on the bearing ring and on the actuating shaft. A small incline demands a relatively large actuating stroke to provide the necessary spread. An increase in the incline, which results in a more rapid positioning of the brake shoe on the brake disk when the actuating stroke is reduced, requires larger actuating cylinders to achieve the same braking effect, due to reduced transmission.

In actual practice the object is to reduce the actuation stroke by means of a minimal return stroke and a clearing play that approaches zero, in order to thereby achieve a more rapid contact of the brake shoe with the brake disk and ultimately to increase the actuation reserve for emergency and complete braking. This requirement is primarily an objective when disk brakes of the given type are to be effectively employed in ABS (antilocking system) braking apparatus, i.e. reduced air consumption per braking action, faster filling times for the actuation cylinders, and thus shorter pressure buildup times for the overall brake apparatus. Given an equal total transmission for the actuating mechanism, faster brake lining contact is achieved due to shorter return strokes.

This requirement can only be fulfilled by a continuously adjustable regulating device, which also operates in a force-dependent manner. In addition, the inventive adjustment device must provide a noticeable simplification vis-a-vis the state of the art, with a reduction of the number of necessary adjustment parts. The adjustment device of the invention must also make possible a simpler reset procedure, while both eliminating chatter upon rapid skipping of the spiral gearing and avoiding the use of a clearance ring for the frictional connection, inasmuch as such rings make resetting more difficult due to fluctuations in the frictional value.

BRIEF SUMMARY OF THE INVENTION

This problem is solved by the invention in that the adjustment sleeve is mounted in rotating fashion on the extension piece of the adjustment nut and is supported by a collar on the adjustment nut; the adjustment sleeve is connected with the adjustment nut by means of an adjustment clutch; the groove in the adjustment ring or in the actuating shaft is an axial groove; and the spiral gearings positioned on the faces of the adjustment sleeve and the adjustment ring permit reciprocal skipping in the direction of brake actuation while the spring component is compressed.

BRIEF DESCRIPTION OF THE DRAWINGS

Several, embodiments of the invention will now be described in detail with reference to the accompanying drawing wherein.

DETAILED DESCRIPTION

Figure 1:
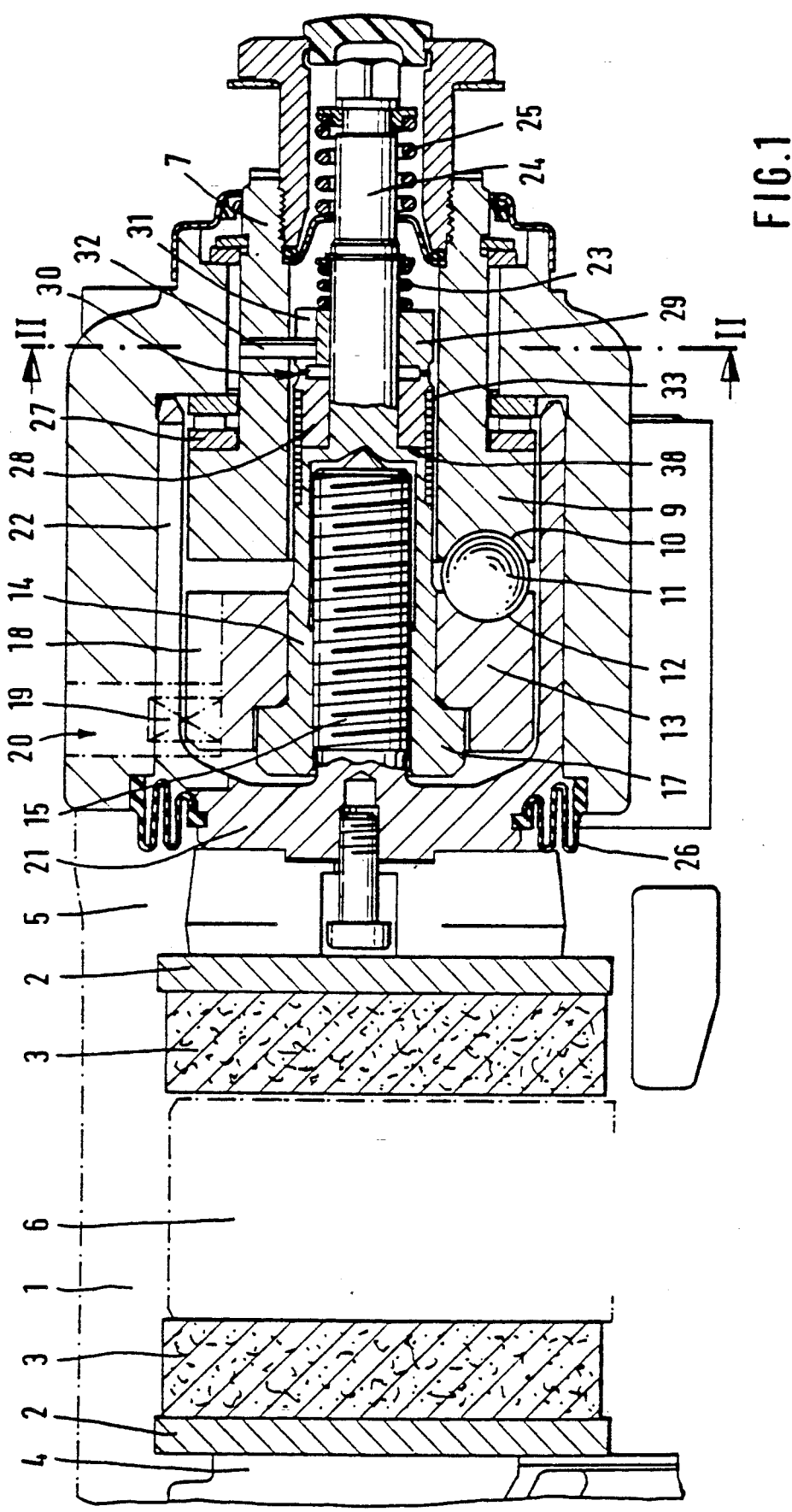
FIG. 1 is an axially cross-sectional view through a sliding saddle disk brake of the invention.

As can be seen from the drawing, the depicted sliding saddle disk brake comprises a sliding saddle 1, whose two saddle halves 4 and 5 cover the brake disk 6, which is indicated by broken lines. The two saddle halves each have a brake lining support 2, which supports a brake lining 3 facing the brake disk 6.

In saddle half 5 of the sliding saddle 1 an actuating shaft 7 is rotationally mounted by means of a lever (not shown). Actuating shaft 7 has an inner end in the form of a bushing with a radially projecting collar 9. On its side facing away from the lever collar 9 is provided with at least two, preferably three, diagonal tracks 10 to receive balls 11, which, on the other side, run in corresponding diagonal tracks 12 on a bearing ring 13. Relative to each other, the corresponding tracks 10 and 12 are positioned on collar 9 and bearing ring 13 in such a way that rotation of the actuating shaft 7 is converted into axial motion of the bearing ring 13 and an adjustment nut 14 supported therein. Screwed into this adjustment nut 14 is a pressure screw 15, which is attached to the piston 21 in torque-resistant fashion, while the piston 21 is prevented from rotation. In order to translate axial forces from the bearing ring 13 to the adjustment nut 14, the latter is furnished with a radially projecting shoulder 17, which engages with bearing ring 13.

In order that the bearing ring 13 can be axially displaced by the actuating shaft without participating in the rotation of the actuating shaft 7, rotation is prevented by an axially parallel guide groove 18, which is engaged by a guide pin 19 also passing through the piston 21 in a groove 22. This guide pin 19 is formed by the projecting front end of a screw bolt 20 screwed into a threaded bore 20' in the sliding saddle 1.

A ring collar 26 of elastic plastic, which extends from the sliding saddle 1 to the piston 21, protects the actuating mechanism from penetration by foreign bodies, dirt and moisture.

On the back side of the collar 9 in a direction opposite from the diagonal tracks 10, an axial bearing 27 is provided that supports actuating shaft 7 on the sliding saddle 1.

The adjustment nut 14 is connected with an extension piece 24 in torsionally reinforced fashion. Rotationally mounted on the extension piece 24 are an adjustment sleeve 28 and an adjustment ring 29, whose facing sides have a spiral gearing 30. The two adjustment parts 28 and 29 are held in position by a compression spring 23 supported by extension piece 24, since the adjustment sleeve 28 rests against the heel of the adjustment nut 14.

The spiral gearing 30 could be replaced by a frictionally engaged coupler. Preferably, however, a very small spiral gearing will be employed, since frictional couplers tend to undesirably separate as a result of vibration or shaking.

Figure 2:
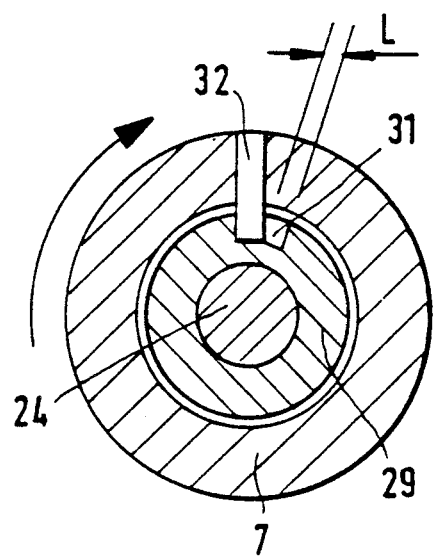
FIG. 2 is a cross-sectional view taken along line II—II in FIG. 1.
Figure 4:
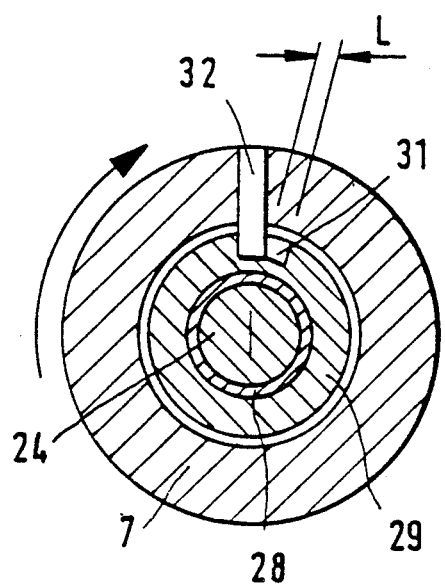
FIG. 4 is a cross-sectional view taken along line IV—IV in FIG. 3.

A pin 32 secured to the actuating shaft 7 engages with an axial groove 31 of the adjustment ring 29 (see FIG. 2). The play L here represents the clearing play. The play can be eliminated, however, if the very low degree of play that is desired can be achieved by the production tolerances of the brake parts alone.

By means of another pressure spring 25, which is supported both by the actuating shaft 7 and the extension piece 24 of the adjustment nut 14, shoulder 17 of adjustment nut 14 is brought into contact with the bearing ring 13, and the spreading device 9, 11, 13 is held in position on the ball guides 10, 12 without play.

On the circumferential area of the adjustment nut 14 and the adjustment sleeve 28, positioned at either side of and resting on a collar, is a wrap spring 33 connecting both of these parts. With its cylindrically wound spring component this radially tensioned wrap spring 33 rests on the circumferential areas of the adjustment parts 14, 28 and forms a directional clutch. When the brake is actuated, this directional clutch transfers torque from the adjustment sleeve 28 to the adjustment nut 14, and when the brake is released it slips through like a freewheel.

The secondary, force-dependent connection is produced by the spiral gearing 30 or, alternatively, by a frictional coupling between the adjustment part 28 and 29.

The force-dependent adjustment process operates as follows:

When the actuating shaft 7 is set in motion by braking in the direction of the arrow, its pin 32, which engages the axial groove 31 of the adjustment ring 29 without play or with play L and which employs the tension exerted by the pressure spring 23, turns the adjustment sleeve 28 by means of the spiral gearings 30 or by means of a frictional coupling. This motion of the adjustment parts 28, 29 is immediately transmitted by the wrap spring 33 to the adjustment nut 14. The torque is greater than the frictional moment, arising via the second pressure spring 25, between the shoulder 17 of the adjustment nut 14 and the bearing ring 13. The clearing play is adjusted by rotation of the adjustment nut 14 against the pressure screw 15.

As soon as the brake linings 3 come into contact with the brake disk 6, the tension-induced friction between the shoulder 17 and the bearing ring 13 increases and therewith exceeds the torque that can be transferred by the spiral gearings 30. When the actuating shaft 7 further rotates in the direction of actuation, the adjustment nut 14 is held in place by the sharply increasing frictional moment on the bearing ring 13, and the adjustment ring 28 slips through against the force exerted by pressure spring 23 by means of the force-dependent spiral gearing 30 or a frictional connection with the adjustment sleeve 28, and further adjustment is prevented.

The portion of the actuation path traveled under brake tension, which results in an elastic deformation of the brake, is thus not taken into account by the adjustment.

When the brake is released the force of the pressure spring 23 presses the adjustment parts 28, 29 together, and as a result of the releasing motion of the actuating shaft 7, the pin 32 turns back these parts 28, 29, according to the wear on the brake linings. The adjustment nut 14 is not turned back as well, since it is held in position on the bearing ring 13 by a second pressure spring 25 and since the wrap spring 33 works as a freewheel during the release motion.

In the subsequent brake action, lining wear is again adjusted in the manner described.

The release action necessary when the brake linings are replaced and a new initial adjustment is set is very simple. A wrench is employed to grasp the extension piece 24 and to turn back the adjustment nut 14 in the locking direction of the wrap spring 33, while the gears of the spiral gearing 30 skip over each other.

In the embodiment shown in FIGS. 1 and 2, it is possible that under certain circumstances—e.g. hardened grease resulting from low temperatures—an excessive degree of adhesive friction will arise between the contact surfaces 38 of the adjustment nut 14 and the adjustment sleeve 28, due to the tension force of the pressure spring 23.

The result may be that after brake actuation, i.e. when the actuating shaft 7 returns to its starting position after the brake is released and as the result of the above-mention adhesive friction, the adjustment nut—despite the neutral direction of the one-way couplings 33 or 34—will be turned back unintentionally with the adjustment parts 28 and 29, thus negating the preceding adjustment performed during brake actuation.

To avoid this, the adhesive friction, caused by the force exerted by the pressure spring 25, between the contact surfaces of parts 13, 17 must be greater than the adhesive friction between parts 14 and 28 produced by the pressure spring 23.

Figure 3:
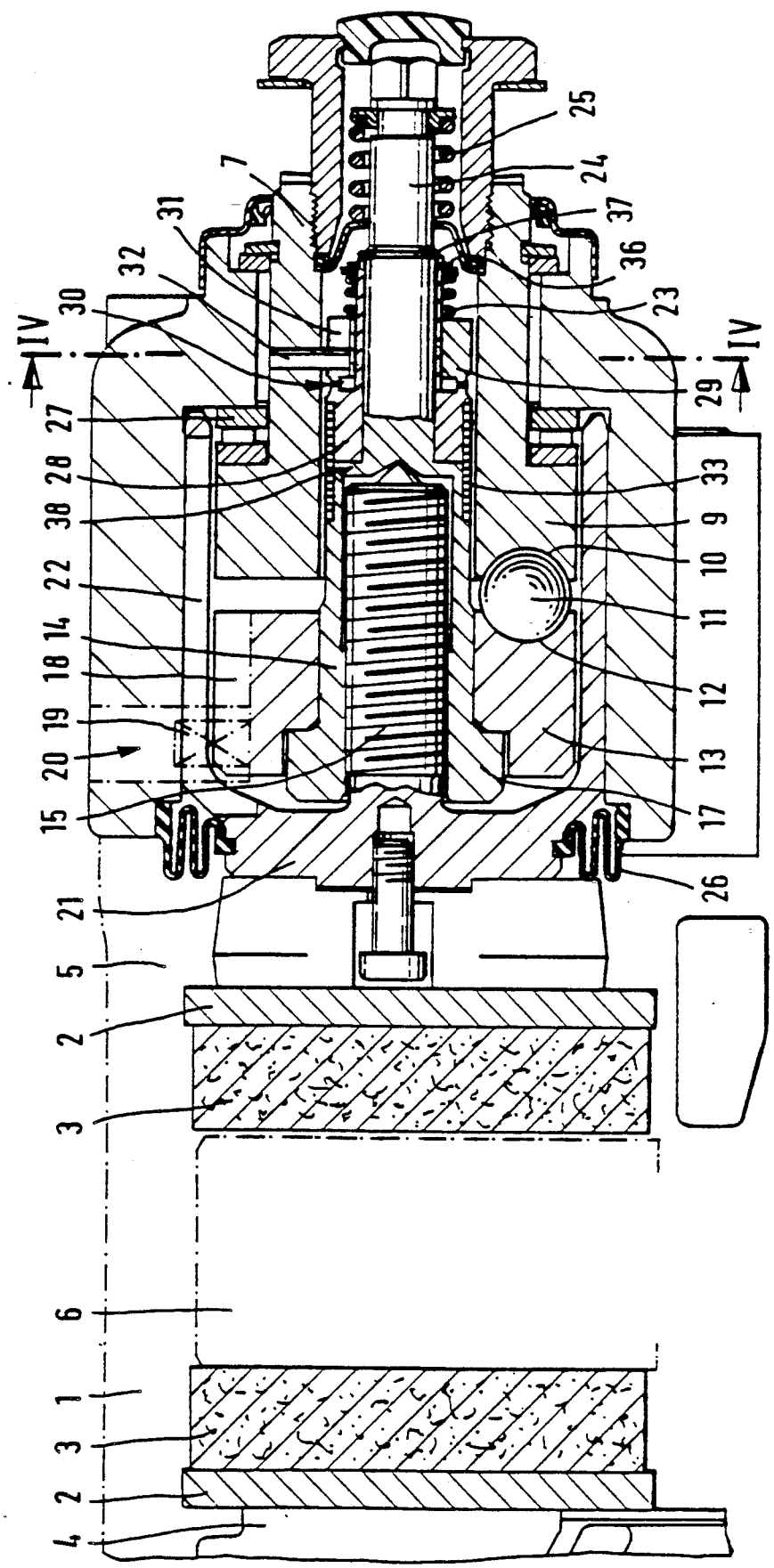
FIG. 3 is a view similar to that of FIG. 1 through a modified embodiment of the invention.
Figure 5:
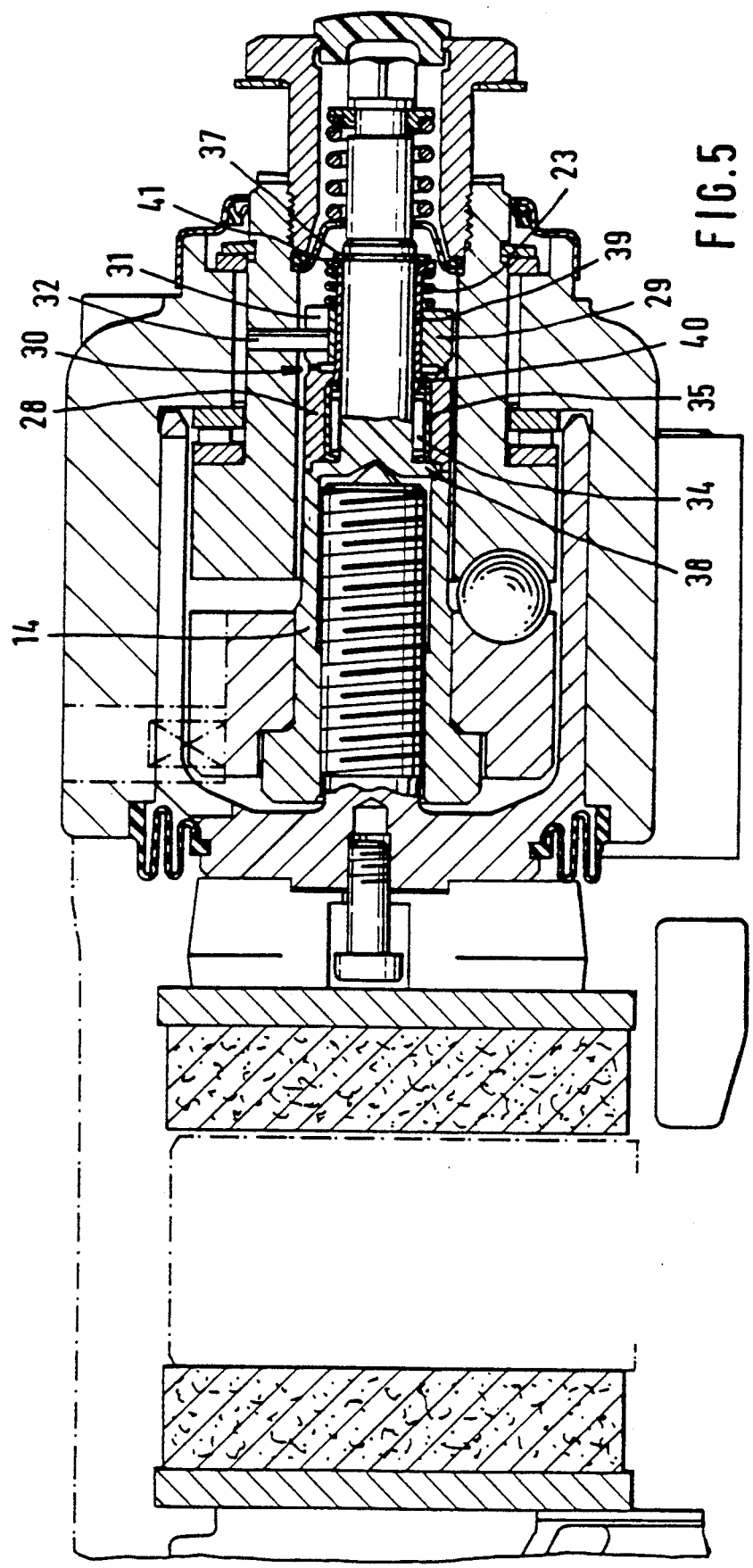
FIG. 5 is a view similar to that of FIG. 1 through another embodiment of the invention.

In order to completely eliminate the axial adhesive friction between the contact surfaces 38 of parts 14, 28, which causes the undesirable return of the adjustment nut 14 after brake actuation, the elaboration shown in FIGS. 3 and 5 is provided. In this preferred embodiment, the adjustment sleeve 28 is provided with an extension, on which the turning and axially sliding adjustment ring 29 rests. The latter is acted on by compression spring 23, which in turn is supported by the extension of the adjustment sleeve 28 by means of an annular disk on the securing ring 36. The spiral gearing 30 of the force-dependent clutch is thereby kept in engaged state. The adjustment sleeve 28 itself is positioned by a fixed heel or retaining ring 37 on the extension piece to prevent axial displacement on the extension piece 24 of the adjustment nut 14.

Thus the adjustment sleeve 28 is held in its position between the contact surface 38 of the adjustment nut 14 and the fixed heel 37, without spring action but with little play. The axial adhesive friction between parts 14 and 28 explained above and resulting from spring-induced force is thereby eliminated.

After brake actuation is complete, thus in the direction of brake release, the adjustment parts 28 and 29 can be turned with the actuating shaft 7 in the freewheel direction of the one-way clutch 33, without the adjustment nut 14 being undesirably entrained in the same direction.

The modified embodiment shown in FIG. 5 omits the wrap spring 33, which acts as a directional clutch for the transfer of torque between the adjustment nut 14 and the adjustment sleeve 28.

In this variation, the role and function of the wrap spring 33 is replaced by the use of a sleeve freewheel 34, which likewise serves as a directional clutch for the transfer of torque between the adjustment nut 14 and the adjustment sleeve 28. Here the outer ring 35 of the freewheeling sleeve 34 rests on the inner circumference of the adjustment sleeve 28, and the inner ring of the freewheeling sleeve 34 rests with its roller bearing on the external circumference of the extension piece 24 of the adjustment nut 14.

This embodiment also guarantees that adhesive friction between the adjustment sleeve 28 and the adjustment nut 14 does not arise. To this end, the adjustment ring 29 rests on a sleeve 39. The latter has two end collars which extend outward radially; the one collar 40 interlocks with a collar of the adjustment sleeve 28 extending radially inward, and the other collar 41 serves as a support for the pressure spring 23 and as an attachment to the fixed heel 37. To be sure, the adjustment parts 28 and 29 are thereby braced one relative to the other, but there is no axial adhesive friction between the adjustment parts and the adjustment nut 14 as caused by the pressure spring 23.

I claim:

1. In an adjustment device for a mechanically actuated disk brake having a sliding saddle movable on a diagonal relative to a brake disk, two saddle halves, a brake lining support and brake lining on each saddle half, an actuating shaft rotatably mounted in one of the saddle halves, a bushing end on said actuating shaft having a radially projecting collar, diagonal tracks on one side of said collar, a bearing ring having corresponding opposing diagonal tracks thereon, ball elements engaging in said diagonal tracks for converting rotational motion of said actuating shaft into axial motion of a pressure screw mounted in piston, torque-resistant means on said pressure screw, an axial bearing on said sliding saddle supporting said actuating shaft for securing said actuating shaft against axial displacement on a side of said collar facing away from said diagonal tracks, said bearing ring being axially movable relative to the sliding saddle but non-rotatable, a sleeve-like adjustment nut supporting said bearing ring, a pressure screw in screw threaded engagement in said adjustment nut, an extension member on said adjustment nut coaxially extending through said actuating shaft, an adjustment ring mounted within said actuating shaft for relative rotation with respect to said extension member, a radial groove in at least one of said actuating shaft and adjustment ring, a radial pin engaging in said radial groove, an adjustment sleeve mounted on said extension member, spiral gear means on adjacent facing surfaces on said adjustment ring and adjustment sleeve, one of said adjustment sleeve and adjustment ring being supported on said adjustment nut, a compression spring means for resiliently urging said spiral gear means into inter-engagement, a directional clutch means between said adjustment ring and said adjustment nut which operates in a direction of brake actuation upon rotation of said actuating shaft, and a torque limiting means for limiting the torque transferred from said adjustment ring to said adjustment nut, the improvement wherein:
said adjustment sleeve is rotatably mounted on said extension member of said adjustment nut;
collar means is provided on said adjustment nut axially engageable with said adjustment sleeve;
said spring means is axially engageable with said adjustment ring;
said directional clutch means comprises an adjustment clutch means for releasably engaging said adjustment sleeve with said adjustment nut;
said groove in said one of said adjustment ring and actuating shaft comprises an axial groove; and
said spiral gear means comprises releasably interengageable spiral gears on said facing surfaces of said adjustment sleeve and adjustment ring so that relative movement between said adjustment ring and adjustment sleeve in an the axial direction of brake actuation when said spring means is compressed allows skipping of said spiral gears.

2. Adjustment device as claimed in claim 1, wherein:
said directional clutch means comprises a wrap spring.

3. Adjustment device as claimed in claim 2, wherein:
said adjustment ring is rotationally mounted directly on said extension member of said adjustment nut; and
said spring means is supported on said extension member.

4. Adjustment device as claimed in claim 2, wherein:
said adjustment sleeve has an axial extension thereon mounted on said extension member on said adjustment nut;
retaining means is provided on said extension member on said adjustment nut engaging one end of said axial extension on said adjustment sleeve for retaining said adjustment sleeve on said extension member;
said adjustment ring is mounted for rotational and axial movement on said axial extension on said adjustment sleeve; and a contact surface is provided on axial said axial extension on said adjustment sleeve engaging the other end of said spring means.

5. Adjustment device as claimed in claim 6, wherein:
said axial extension is integral with said adjustment sleeve to form a single member; and
said contact surface on said axial extension comprises a retaining ring.

6. Adjustment device as claimed in claim 4, wherein:
said axial extension on said adjustment sleeve comprises a separate axially extending sleeve;
a first collar is provided on said separate sleeve interlocking with said adjustment sleeve; and
said contact surface on said axial extension comprises a second collar on said separate sleeve.

7. Adjustment device as claimed in claim 1, wherein:
said directional clutch means comprises a freewheeling sleeve means.

8. Adjustment device as claimed in claim 7, wherein:
said adjustment ring is rotationally mounted directly on said extension member of said adjustment nut; and
said spring means is supported on said extension member.

9. Adjustment device as claimed in claim 7, wherein:
said adjustment sleeve has an axial extension thereon mounted on said extension member on said adjustment nut;
retaining means is provided on said extension member on said adjustment nut engaging one end of said axial extension on said adjustment sleeve for retaining said adjustment sleeve on said extension member;
said adjustment ring is mounted for rotational and axial movement on said axial extension on said adjustment sleeve; and
a contact surface is provided on said axial extension on said adjustment sleeve engaging the other end of said spring means.

10. Adjustment device as claimed in claim 9, wherein:
said axial extension is integral with said adjustment sleeve to form a single member; and
said contact surface on said axial extension comprises a retaining ring.

11. Adjustment device as claimed in claim 9, wherein:
said axial extension on said adjustment sleeve comprises a separate axially extending sleeve;
a first collar is provided on said separate sleeve interlocking with said adjustment sleeve; and
said contact surface on said axial extension comprises a second collar on said separate sleeve.

12. Adjustment device as claimed in claim 1, wherein:
said adjustment ring is rotationally mounted directly on said extension member of said adjustment nut; and
said spring means is supported on said extension member.

13. Adjustment device as claimed in claim 1, wherein:
said adjustment sleeve has an axial extension thereon mounted on said extension member on said adjustment nut;
retaining means on said extension member on said adjustment nut engaging one end of said axial extension on said adjustment sleeve for retaining said adjustment sleeve on said extension member;
said adjustment ring is mounted for rotational and axial movement on said axial extension on said adjustment sleeve; and
a contact surface is provided on said axial extension on said adjustment sleeve engaging the other end of said spring means.

14. Adjustment device as claimed in claim 13, wherein:
said axial extension is integral with said adjustment sleeve to form a single member; and
said contact surface on said axial extension comprises a retaining ring.

15. Adjustment device as claimed in claim 13, wherein:
said axial extension on said adjustment sleeve comprises a separate axially extending sleeve;
a first collar is provided on said separate sleeve interlocking with said adjustment sleeve; and
said contact surface on said axial extension comprises a second collar on said separate sleeve.

* * * * *